UNITED STATES PATENT OFFICE.

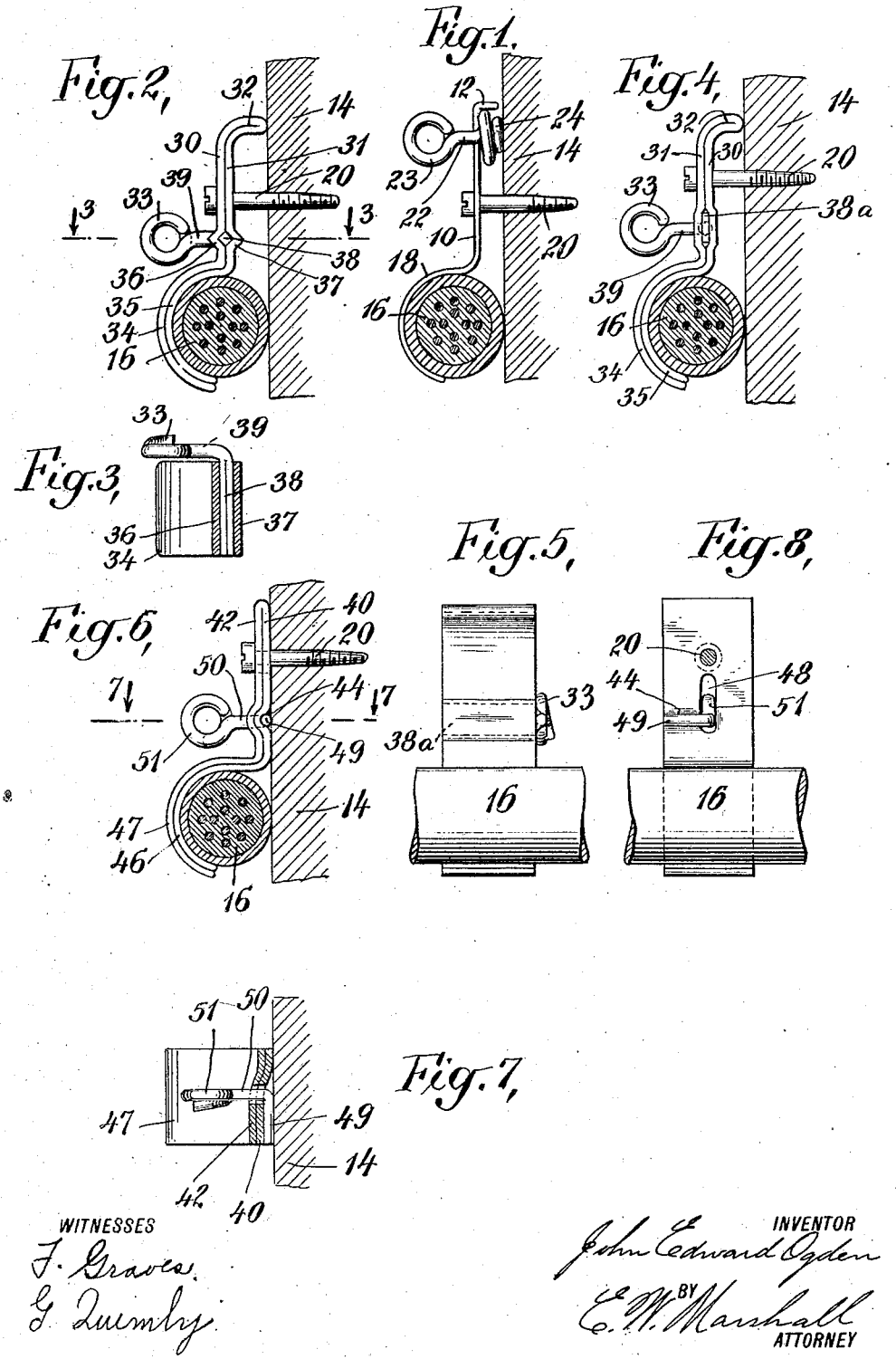

JOHN EDWARD OGDEN, OF BROOKLYN, NEW YORK.

CABLE-CLAMP.

1,060,016.  Specification of Letters Patent.  Patented Apr. 29, 1913.

Application filed June 18, 1912. Serial No. 704,423.

*To all whom it may concern:*

Be it known that I, JOHN EDWARD OGDEN, a citizen of the United States, and a resident of Brooklyn, county of Kings, and State of New York, have invented certain new and useful Improvements in Cable-Clamps, of which the following is a specification, reference being had to the accompanying drawings, forming a part thereof.
This invention relates to devices for hanging or supporting electric cables and wires along the faces of walls, ceilings, fences or other structures.

The object of the invention is to improve the mode of attaching the so-called bridle ring to the clamp.

As now commonly constructed the cable clamps are provided with threaded holes into which the shank or stem of the bridle ring is adapted to be screwed. When the cable line is erected it is often customary to leave off the bridle rings as they are not needed at first. The hole in the clamp is thus exposed to the weather and the metal soon rusts. Later when it is desired to run a messenger wire, and attempts are made to put in place the bridle rings on the clamps, it is often found that the threads in the holes provided therefor have corroded so badly or have otherwise become so damaged that they will not properly engage and hold the shank or stem of the bridle ring.

Accordingly, the primary purpose of this invention is to overcome the objections inherent in the clamps as heretofore made, by obviating the necessity of a screw threaded hole in the clamp for engagement with the shank of the bridle ring.

To this end the invention contemplates the provision of a bridle ring having its shank so formed that it will engage the inner surface or surfaces of the clamping member and will be held in place thereby without a screw threaded engagement with the body of the clamp.

I will describe my invention in the following specification and point out the novel features thereof in appended claims.

In the accompanying drawing, Figure 1 is a side elevation of one embodiment of my invention. Fig. 2 is a side elevation of a modified form. Fig. 3 is a horizontal section taken on the line 3—3 in Fig. 2. Fig. 4 is a side elevation of a structure similar to that shown in Figs. 2 and 3, but slightly modified. Fig. 5 is a rear elevation of the device shown in Fig. 4. Fig. 6 is a side elevation of another modified form. Fig. 7 is a section taken on the line 7—7 in Fig. 6. Fig. 8 is a rear elevation of the device shown in Figs. 6 and 7.

Like characters of reference indicate corresponding parts in all of the figures.

As illustrated in Fig. 1 the hanger or clamp comprises a clamping member formed of a sheet metal strap having a flat portion 10 and bent as its upper end at substantially right angles to form a lateral projection or toe 12 adapted to engage the wall or other support 14 upon which the cable 16 is carried. The lower portion of the clamping member is curved at 18 to conform to the exterior of the cable 16.

A hole is provided in the flat portion 10 to receive a securing screw 20, by means of which the hanger is affixed to the support 14. This securing member is preferably a screw, as shown, although any other suitable holding means may be employed. The flat portion 10 is also provided with a smooth-bored hole to receive the shank or stem 22 of a bridle ring 23. The end portion of the shank is formed into a spiral, which is adapted to be threaded through the hole provided therefor and to engage the inner face of the flat portion 10, with the outer end of the spiral engaging the wall 14. The spiral 24 is preferably a little longer than the toe 12, so that when it engages the wall 14 it forces the end of the toe away from the wall as shown. Then when the screw 20 is tightened the spiral is firmly clamped between the flat portion 10 and the wall 14. When the cable line is first erected and no messenger wire is required the bridle rings are omitted and the toe 12 engages the wall 14. When it is desired to erect the messenger wire, and to provide means for supporting it the screw 20 may be loosened slightly, the spiral 24 threaded through the hole provided therefor, and then the screw 20 again tightened and the spiral and cable clamped securely in place.

As illustrated in Figs. 2, 3 and 4 the hanger or clamp comprises a sheet metal strap bent back upon itself to form a double thickness. It comprises a double flat portion 30, 31, the upper doubled end of which is bent at substantially right angles to form a lateral projection or toe 32 which is adapted to rest against the face of the wall 14.

The lower portions of the clamp are curved as shown at 34, 35 to conform to the exterior of the cable 16.

The flat portions 30, 31 are provided with registering holes to receive the screw 20 with which the hanger is affixed to the wall or structure 14. The flat portions 30, 31 are deflected in opposite directions at 36, 37 to form opposed channels which are adapted to receive the end portion 38 of the shank 39 of a bridle ring 33. These channels in the form shown in Figs. 2 and 3 are made V-shaped and together produce a rectangular space into which the rectangular end portion 38 of the shank 39 fits. The portion 38 is bent at substantially right angles to the shank 39, so that when the former is in place, the plane of the ring 33 is vertical and at substantially right angles to the wall 14. If desired the end of the shank may be flattened or broadened as at 38ª shown in Figs. 4 and 5 and the clamp sections deflected to form together a correspondingly shaped channel.

When it is desired to erect the messenger wire, the screw 20 may be loosened sufficiently to enable the bent over end 38 or 38^A of the shank to be inserted between the portions 36, 37. Then the screw 20 is tightened to clamp the cable, and the bent over portion 38 of the shank is thereby clamped between the portions 36, 37 of the hanger.

As illustrated in Figs. 6, 7 and 8 the hanger or clamp is composed of a sheet metal strap bent back upon itself to form a double thickness. It comprises a flat portion 40 which provides a flat base or bearing portion which is adapted to lie against the face of the wall 14. The strap is formed with a bend at its upper end and with a portion 42 parallel to the base 40 and adjacent thereto. The strap is pressed to form a transverse channel 44 in the flat portion 40 to one side of the center of the base. The lower portion of both sections of the strap are curved at 46, 47 to conform to the exterior of the cable 16. The flat portions 40, 41 are provided with registering holes to receive the screw 20, by means of which the clamp is affixed to the wall or support 14. The outer strap section is provided with an elongated slot 48 which communicates with the channel 44, the lower end of said slot corresponding to the lower edge of said channel. The slot 48 is of such a length as to admit of the insertion therethrough of the end portion 49 of the shank 50 of a bridle ring 51. In order to introduce the end 49 of the shank 50, the screw 20 is loosened sufficiently to allow for the insertion of the end through said slot, which end is then turned at right angles into the position shown in the drawing. Thereupon the screw may be tightened to clamp the two strap sections together and against the cable.

With the construction above set forth it will be noted that there are no screw threads on the clamp, which can become corroded, and the shank of the bridle ring is securely anchored by engagement with the face or faces of the strap sections.

What I claim is:

1. A hanger for supporting a cable against a wall or similar surface, comprising a curved body portion adapted to partially encircle the cable, a portion adapted to engage said surface, and a bridle ring provided with a shank shaped to pass through the hanger and be engaged and clamped by said hanger.

2. A hanger for supporting a cable against a wall or similar surface, comprising a doubled clamp having one end curved to partially encircle the cable and having a portion adapted to engage said surface, said clamp having its two opposed portions shaped to provide a space therebetween, and a bridle ring having a shank and an end portion at right angles thereto adapted to be clamped in said space.

In witness whereof, I have hereunto set my hand this 17th day of June 1912.

JOHN EDWARD OGDEN.

Witnesses:
I. B. MOORE,
ELIZABETH ALEXANDER.